(12) United States Patent
Fu et al.

(10) Patent No.: US 9,370,958 B2
(45) Date of Patent: Jun. 21, 2016

(54) PRINTABLE MEDIUM

(71) Applicant: HEWLETT-PACKARD DEVELOPMENT COMPANY, L.P., Houston, TX (US)

(72) Inventors: Xulong Fu, San Diego, CA (US); Xiaoqi Zhou, San Diego, CA (US); Paul C Landrum, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/654,122

(22) PCT Filed: Jan. 30, 2013

(86) PCT No.: PCT/US2013/023822
§ 371 (c)(1),
(2) Date: Jun. 19, 2015

(87) PCT Pub. No.: WO2014/120149
PCT Pub. Date: Aug. 7, 2014

(65) Prior Publication Data
US 2015/0367666 A1   Dec. 24, 2015

(51) Int. Cl.
| *B41M 5/00* | (2006.01) |
| *B41M 5/50* | (2006.01) |
| *B32B 7/12* | (2006.01) |
| *B32B 29/00* | (2006.01) |
| *B32B 37/06* | (2006.01) |
| *B32B 37/10* | (2006.01) |
| *B32B 37/12* | (2006.01) |
| *B41M 5/52* | (2006.01) |

(52) U.S. Cl.
CPC .................. *B41M 5/508* (2013.01); *B32B 7/12* (2013.01); *B32B 29/005* (2013.01); *B32B 37/06* (2013.01); *B32B 37/10* (2013.01); *B32B 37/12* (2013.01); *B32B 2255/12* (2013.01); *B32B 2307/4026* (2013.01); *B32B 2307/718* (2013.01); *B32B 2307/75* (2013.01); *B41M 5/5218* (2013.01); *Y10T 428/24901* (2015.01)

(58) Field of Classification Search
CPC ....... B41M 5/5218; B41M 5/508; B32B 7/12; B32B 37/06; Y10T 428/24901
See application file for complete search history.

(56) References Cited

U.S. PATENT DOCUMENTS

| 3,323,974 | A | 6/1967 | Kenin et al. |
| 5,885,928 | A | 3/1999 | Hirano et al. |
| 8,563,100 | B1 * | 10/2013 | Zhou .................... B41M 5/5218 428/32.16 |
| 2005/0003174 | A1 | 1/2005 | Ikeda et al. |
| 2006/0240236 | A1 | 10/2006 | Bland et al. |
| 2007/0287345 | A1 | 12/2007 | Confalone et al. |
| 2012/0291377 | A1 | 11/2012 | Riebel et al. |

FOREIGN PATENT DOCUMENTS

| GB | 1328578 | 8/1973 |
| JP | 2001-146673 A | 5/2001 |
| JP | 2009-179900 A | 8/2009 |
| KR | 10-0875984 B1 | 12/2008 |

* cited by examiner

*Primary Examiner* — Betelhem Shewareged
(74) *Attorney, Agent, or Firm* — Dierker & Kavanaugh, P.C.

(57) ABSTRACT

An inkjet printable medium includes an opaque substrate having $I(x)/I_0$ equal to or less than 0.05, wherein $I(x)$ is an intensity of light remaining at a distance x, where x is the distance that light travels through the substrate, and wherein $I_0$ is an initial intensity of light at x=0. The substrate includes at least two non-woven paper layers; and an adhesive, opacity enhancing layer disposed between the at least two non-woven paper layers, the adhesive layer including a visible light-blocking dye or pigment. An image receiving layer is coated on the substrate. The substrate has a basis weight ranging from about 100 gsm to about 500 gsm.

15 Claims, 3 Drawing Sheets

PRINTABLE MEDIUM

BACKGROUND

Wall covering materials are often used for home and/or commercial decoration and display. In order to be useful for these applications, wall covering materials need to be durable (e.g., meeting desired strength specifications). The wall covering materials also need to be of a sufficient opacity so as to hide, e.g., imperfections on the wall and/or prior wall coverings, paint, or the like.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
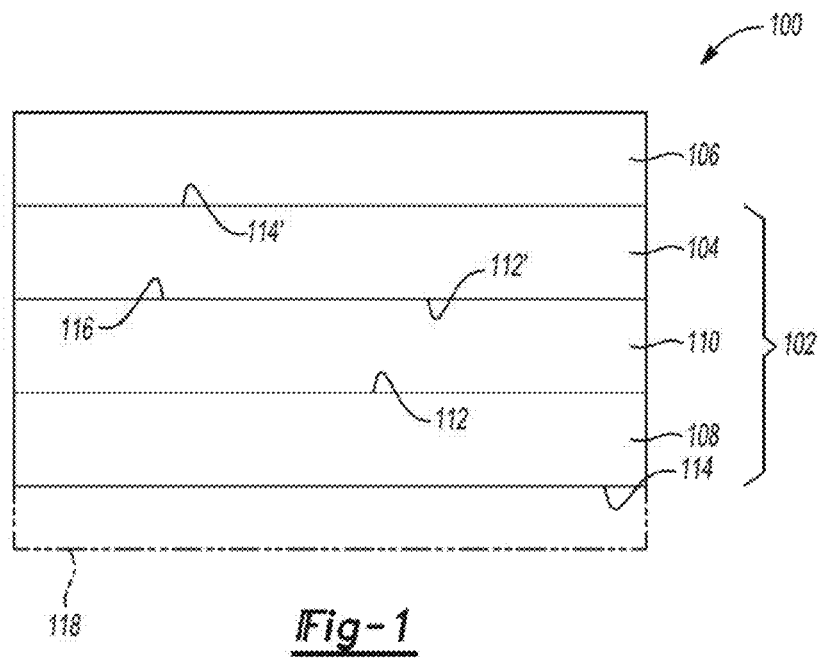
FIG. 1 schematically depicts an example of a printable medium.

Examples of the inkjet printable medium, as disclosed herein, may be used as a wall covering material (e.g., wallpaper) for home or commercial use, for decoration or display. The printable medium is specifically designed to receive thereon any inkjet printable ink, such as, for example, organic solvent-based inkjet inks or aqueous-based inkjet inks. Some examples of inkjet inks that may be deposited, established, or otherwise printed on the examples of the printable medium include pigment-based inkjet inks, dye-based inkjet inks, pigmented latex-based inkjet inks, and UV curable inkjet inks.

The inkjet printable ink may be deposited, established, or printed on the printable medium using any suitable inkjet printing device. In an example, the ink may be deposited, established, or printed on the printable medium via continuous inkjet printing or via drop-on-demand inkjet printing, which includes thermal inkjet printing and piezoelectric inkjet printing.

Additionally, the examples of the printable medium are also designed to receive thereon a solid toner or a liquid toner. The solid toner or the liquid toner may include toner particles made, e.g., from a polymeric carrier and one or more pigments. The liquid toner may be an organic solvent-based (e.g., hydrocarbon) liquid toner. The solid toner or the liquid toner may be deposited, established, or otherwise printed on the examples of the printable medium using, respectively, a suitable dry or liquid press technology, such as a dry toner electrophotographic printing device or a liquid toner electrophotographic printing device.

The substrate of the examples of the printable medium may be described herein at least in terms of its opacity. As used herein, the opacity of the substrate refers to the impenetrability of the substrate to visible light. As such, an opaque substrate is one that is neither transparent nor translucent. In an example, the opaque substrate will reflect, scatter, or absorb all of the electromagnetic waves in the spectrum range at which a human eye will respond, which is known as visible light; i.e., wavelengths ranging from about 390 nm to about 750 nm, in another example, the opaque substrate has zero light transmission within the visible light spectrum. In yet another example, the opacity of the substrate may be described by Equation (1):

$$I(x)=I_0 e^{-K_v \rho K} \quad \text{(Eqn 1)}$$

where x is the distance that light travels through the substrate (i.e., the thickness of the substrate measured in meters), I(x) is the intensity of light (measured in $W/m^2$) remaining at the distance x, $I_0$ is the initial intensity of light (measured in $W/m^2$) when x is zero (i.e., when the distance x is equal to 0), v is the light frequency (measured in Hz), ρ is the mass density of the substrate (measured in $kg/m^3$), and $K_v$ is the opacity of the substrate. In an example, an opaque substrate 102 is one where the opacity $K_v$ is greater than a value that, when used in Equation 1, renders $I(x)/I_0$ equal to or less than 0.05. In some examples, this value ranges from zero to 0.05, or ranges from about 0.01 to about 0.02.

FIG. 1 schematically illustrates an example of an inkjet printable medium 100. It is to be understood that the thickness of the various layers is exaggerated for illustrative purposes. An example of inkjet printable medium 100 includes an opaque substrate 102 including at least two non-woven paper layers 104, 108 and an adhesive, opacity enhancing layer 110 disposed between. The adhesive layer 110 is coated on a surface 112 of paper layer 108. Paper layer 104 is attached to an adjacent area 116 of adhesive layer 110. It is to be understood that there may be more than two non-woven paper layers 104, 108. For example, if there were a third, fourth, fifth, etc. non-woven paper layer (not shown), it may be adjacent to, e.g., paper layer 108, with an additional adhesive layer 110 at surface 114 of paper layer 108, disposed between the third paper layer and paper layer 108.

In examples of the present disclosure, the substrate 102 has a basis weight ranging from about 100 gsm ($g/m^2$) to about 500 gsm ($g/m^2$). In an example, the basis weight of the substrate 102 ranges from about 150 gsm to about 300 gsm. Further, in an example, the substrate 102 has a thickness ranging from about 100 microns to about 700 microns, and in another example, the substrate 102 has a thickness ranging from about 150 microns to about 400 microns.

An example of the inkjet printable medium 100 further includes an image receiving layer 106 coated on substrate 102. It is to be understood that the image receiving layer 106 may be coated on the surface of paper layer 104 as shown; or image receiving layer 106 may be coated on the opposed surface, i.e., at surface 114 of paper layer 108.

In another example of the inkjet printable medium 100, a glue layer is coated on a surface of the substrate 102 opposed to the surface upon which the image receiving layer 106 is disposed. An example of the glue layer is shown in phantom at 118 in FIG. 1 on the surface 114 of paper layer 108. The glue in glue layer 118 is suitable for adhering inkjet printable medium 100 to a wall.

In some examples, the glue layer 118 may include a reactive polymer, a surfactant, and/or a defoaming agent. For example, the glue layer 118 may include each one of the reactive polymer, the surfactant, and the defoaming agent. As examples, the polymer may be a polymer or copolymer of acrylic acid, methacrylic acid, or their derivatives; a polymer or copolymer of hydrocolloids such as alginates, carrageenan, and the like, extracted from natural products such as seaweed; or a polymer or copolymer of hydroxyethylcellulose. Examples of suitable defoamers include AC-22 (available from Performance Process, Inc., Mundelein, Ill.), ANTI-SPUMIN™ (available from Ashland, Covington, Ky.), TEGO® Foamex N, TEGO® Foamex 1488, TEGO® Foamex 7447, and TEGO® Foamex 3062 (all of the TEGO® Foamex products are available from Evonik Industries, Germany). Examples of suitable surfactants for the glue layer 118 include those available from BYK Additives and Instruments (such as BYK®-023, BYK®-333, BYK®-348, BYK®-349, BYK®-3400, BYK®-DYNWET®800, and BYK®-380N), those available from Air Products, Co. (such as SURFYNOL® 440 and SURFYNOL® 465), and fluorinated surfactants available from E.I. DuPont de Nemours and Co. (e.g., ZONYL® family surfactants such as ZONYL® FSO and ZONYL® FSN).

In other examples, the glue layer 118 may include from about 3% to about 5% starch, cellulose or another polysaccharide with an amount of less than 1% of polyvinyl acetate (PVA) or other latex-based adhesive. In some other examples, the glue layer 118 includes modified natural polymers, such as carboxymethyl cellulose, dextrin, starches, and the like. In still some other examples, the glue layer 118 may include carboxylated high molecular weight acrylic copolymers and/or inorganic fillers.

Examples of the adhesive, opacity enhancing layer 110 include a visible light-blocking dye or pigment having an L* ranging from about 0 to about 30. L* is a color space coordinate of the color space method, where L* defines the lightness of a color. Generally, a high L* indicates a brighter-colored material, while a low L* indicates a deeper-colored material. The dye or pigment may, in an example, have a color space coordinate L* that is less than 30, and at this L* value, the dye or pigment exhibits a relatively deep color that can readily absorb light within the visible spectrum range. In another example, the dye or pigment may have an value of about 0, and the dye or pigment will exhibit a black color.

It is to be understood that the color of the dye or pigment may be a color other than a black color, such as a grey color, green color, etc. as long as the opacity of the substrate 102 defined by $I(x)/I_0$ is less than or equal to 0.05. It is to be understood that for some colors, the L* may be greater than 30. For example, the color grey may have an L* equal to 50 and also have $I(x)/I_0$ less than or equal to 0.05. In these examples, the substrate 102 will still be opaque as defined herein.

Some suitable examples or the visible light-blocking dye or pigment may include one or a combination of the following direct black dyes: Pergasol Black LVC, Pergasol Black BTB, Fastusol Black 16L, Fastusol Black 18L (the Pergasol and Fastusol dyes are available from BASF in Florham Park, N.J.), Cartasol of Black LC (available from SK Capital Partners, New York, N.Y.), Pontamine Black LD, Pontamine Black SP, Pontamine Black OX (the Pontamine dyes are available from Kemira in Helsinki, FI), Elcomine Black SP, Elcomine Black ESE, and Elcomine Black TD (the Elcomine dyes are available from Greenville Colorants in Greenville, S.C.).

Some suitable examples of the visible light-blocking dye or pigment may include one or a combination of the following Pigment Black 7s: Irgalite Black 2BL Paste, Solar P Black 04L & PR404L (the Irgalite Black and Solar P Black are available from BASF in Florham Park, N.J.), Black 9564-2 Paste 020 (available from SK Capital Partners, New York, N.Y.), Ponolith Supra Black B Liq. (available from Kemira in Helsinki, FI), and Elcoment Black J Liquid (available from Greenville Colorants in Greenville, S.C.).

Further, it is to be understood that the opacity enhancing adhesive layer 110 may include a mixture of visible light-blocking dyes and visible light-blocking pigments. As one example, the dyes and pigments may be dissolved in a liquid polymeric carrier. As another example, the dyes and pigments may be dispersed as small particles (e.g., nano articles and/or micro articles) in the liquid polymeric carrier.

In an example, the adhesive layer 110 has a thickness ranging from about 2 microns to about 50 microns or from about 5 microns to about 20 microns, and the adhesive layer 110 includes a polymeric carrier having a glass transition temperature ($T_g$) ranging from about −40° C. to about 80° C.

In an example, the polymeric carrier for the adhesive layer 110 is a macromolecular aqueous emulsion chosen from polybutadiene latex, styrene-butadiene copolymer latex, acrylonitrile-butadiene-styrene terpolymer latex, polychloroprene latex, acrylic latex, polyester emulsions acrylonitrile-butadiene latex, polyvinyl acetate, polyvinyl acetate copolymers (e.g., vinyl acetate-ethylene latex), and combinations thereof.

In another example, the polymeric carrier for the adhesive layer 110 is an aqueous solution containing water soluble synthetic macromolecules. Examples of water soluble synthetic macromolecules include polyvinyl alcohol, polyacrylamides, polyvinylpyrrolidone, polyacrylic acid, partially esterified polyacrylic acid, polyisocyanates, cationic polyelectrolytes, polyethylene oxides, and combinations thereof. In still another example, the polymeric carrier for the adhesive layer 110 is an aqueous solution containing water soluble natural macromolecules. Examples of water soluble natural macromolecules include virgin starch, oxidized starch, cationized starch, esterified starch, enzymatically denatured starch, gelatin, casein, soybean protein, carboxyl-methyl cellulose, hydroxyethyl cellulose, and combinations thereof. In yet another example, the polymeric carrier for the adhesive layer 110 is a commercially available aqueous solution containing water soluble macromolecules. Examples of these commercially available products include those supplied by The Dow Chemical Co. (Midland, Mich.), such as BIO-CARE™ polymers; CELLOSIZE™ hydroxyethyl cellulose (HEC) polymers; ETHOCEL™ ethylcellulose polymers; KYTAMER™ PC polymers; METHOCEL™ cellulose ethers; POLYOX™ water soluble polyethylene oxide polymers; SoftCAT™ polymers; UCARE™ polymers; UCON™ fluids; and combinations thereof.

It is to be understood that the components listed immediately above can be used individually as the polymeric carrier or can be combined. For example, polymer latex can be mixed with water soluble macromolecules to form the polymeric carrier.

The amount visible light-blocking dye or pigment included in the polymeric adhesive carrier generally depends on the overall light blocking property desired. In an example, the amount of dye/pigment (relative to the total weight of the opacity enhancing adhesive layer 110) ranges from about 0.05 wt % to about 3 wt %. In another example, the amount of dye/pigment (relative to the total weight of the opacity enhancing adhesive layer 110) ranges from about 0.5 wt % to about 3 wt %.

In some examples, a solution (e.g., as shown schematically at bath 510 in FIG. 5) for forming the adhesive layer 110 may further include a crosslinking agent and a solvent. The crosslinking agent (if used) of the adhesive layer 110 may generally be used to increase the hardness and adhesion strength of the adhesive layer 110. Examples of suitable crosslinking agents include boric acid and glyoxal. In an example, the crosslinking agent is present in the adhesive layer 110 in an amount ranging from about 5 wt % to about 30 wt % of the total wt % of the adhesive layer 110.

In an example, the solution that is coated on the paper layer(s) 104, 108 to form the adhesive layer 110 is made up of the visible light-blocking dyes/pigments, the polymeric carrier, the crosslinking agent (if used), and a solvent. When the adhesive solution is coated onto the paper layer(s) 104, 108, the solvent will substantially evaporate upon forming the thin film/adhesive layer 110. The adhesive layer 110 that is formed will then include the polymeric carrier, the crosslinking agent (if used), the visible light-blocking dyes/pigments, and a small, amount (e.g., from about 3 wt % to about 6 wt % (e.g., about 5 wt %) of the total wt % of the adhesive layer 110) of the solvent.

The solvent may be chosen from any solvent, e.g., as long as a difference in solubility between the polymeric carrier and the solvent is, for example, less than about $1.2 \ (cal \cdot cm^{-3})^{1/2}$. In another example, the solvent is selected so the difference in solubility between the polymeric carrier and the solvent ranges, for example, from about $0.5 \ (cal \cdot cm^{-3})^{1/2}$ to about $0.8 \ (cal \cdot cm^{-3})^{1/2}$. The polymeric carrier solubility may be estimated, for example, using inverse gas chromatography. Examples of solvents that may be used for the adhesive solution include water, water and alcohol mixtures, or organic solvents, such as carbon tetrachloride, chlorobenzene, chloroform, cyclohexane, 1,2-dichoroethane, diethyl ether, diethylene glycol, ethylene glycol, 1,2-dimethoxyethane, dimethylether, dimethylformamide, dimethyl sulfoxide, dioxane, ethyl acetate, glycerin, pyridine, tetrahydrofuran, toluene, and m-xylene.

Further, the coat weight of the adhesive layer 110 ranges, for example, from about 10 gsm to about 50 gsm. In another example, the coat weight of the adhesive layer 110 ranges from about 20 gsm to about 35 gsm.

In another example, the adhesive layer 110 may be formed of a dye and pigment that is pre-mixed with a solid thermal plastic substance that exhibits adhesive properties. The solid thermal plastic substance having the dye and pigment mixed therein may be formed into a thin colored adhesive layer/film using a pressure and heat press. The thin colored adhesive layer/film may then be sandwiched between two non-woven paper layers 104, 108, and an image receiving layer 106 may be applied thereon. Details of this example of the method will be discussed further herein in reference to FIGS. 1 and 3B, The solid thermal plastic substance is based on thermal plastic polymers, such as ethylene-vinyl acetate (EVA) copolymers, polyolefins (e.g., low-density polyethylene (LOPE), high-density polyethylene (HDPE), polypropylene (PP), atactic polypropylene (APP), polybutene-1, oxidized polyethylene, etc.), polyamides, polyesters; thermoplastic polyurethane, styrene-butadiene-styrene copolymer (SBS), polystyrene block copolymers (e.g., styrene-isoprene-styrene, styrene-ethylene/butylene-styrene, styrene ethylene/propylene, etc.), polycarbonate, and silicone rubbers.

Each of the two or more non-woven paper layers 104, 108, in examples of the present disclosure, is formed from polymeric fibers, a binder, and a blend of hardwood fibers and softwood fibers.

Examples of the polymeric fibers include polyesters, polyamides, polyolefins, or any combination thereof. In an example, the polymeric fibers are synthetic fibers or filaments of polyesters (e.g., polyethylene terephthalate (PET)), polyamides (e.g., nylons), polyimides, polyacrylics, polypropylenes, polyethylenes, polyurethanes, polystyrenes, polyaramids (e.g., KEVLAR®), polytetrafluoroethylene (e.g., TEFLON®), fiberglass, polytrimethylene, polycarbonates, polyester terephthalate, polybutylene terephthalate, or combinations thereof. In one example, synthetic polyolefin fibers, such as polyethylene fibers, polyethylene copolymers fibers, polypropylene fibers, and propylene copolymer fibers may be included in the non-woven paper layers 104, 108, Synthetic fibers may improve a number of characteristics of the non-woven paper layers 104, 108, such as the water resistance and dimensional stability.

Examples of suitable hardwood fibers include pulp fibers derived from deciduous trees (angiosperms), such as birch, aspen, oak, beech, maple, and eucalyptus. Examples of suitable softwood fibers include pulp fibers derived from coniferous trees (gymnosperms), such as varieties of fir, spruce, and pine (loblolly pine, slash pine, Colorado spruce, balsam fir, and Douglas fir).

In some examples, each of the two or more non-woven paper layers 104, 108 contains from about 3 wt % to about 50 wt %, or from about 10 wt % to about 30 wt % synthetic polymeric fibers with respect to the total wt % of fibers present in the layer(s) 104, 108. In an example, each of the two or more non-woven paper layers 104, 108 contains from about 50 wt % to about 90 wt % wood fibers (e.g., softwood fiber and hardwood fiber) with respect to the total wt % of fibers present in the layer(s) 104, 108. Further, it is to be understood that recycled fibers may be used to replace virgin fibers.

Suitable binders include water soluble polymers, such as polyvinyl alcohol, starch derivatives, gelatin, cellulose derivatives, or acrylamide polymers, and water-dispersible polymers, such as acrylic polymers or copolymers, vinyl acetate latex, polyesters, vinylidene chloride latex, styrene-butadiene copolymer latex, or acrylonitrile-butadiene copolymer latex. The binders can be pre-mixed with the polymeric fibers.

A ratio of binder to polymeric fibers ranges from about 0.05:1 to about 0.3:1 in examples of the present disclosure.

Aqueous coupling agents may also be used in the two or more non-woven paper layers 104, 108 to improve binding between the fibers.

In an example, each of the two or more non-woven paper layers 104, 108 is a sheet or web structure bonded together by mechanically, thermally or chemically entangling the polymeric fibers or filaments with natural cellulose fibers. For example, non-woven fiber structures include fiber structures that are bonded together by any of a chemical treatment process (e.g., solvent treatment and chemical bonding processes, such as a wetlaid process), a mechanical treatment process (e.g., embossing), or a thermal treatment process (e.g., heating and pressing processes). When bonded, the fiber structures are attached to one another, however the fibers do not necessarily form a weave.

It is to be understood that some synthetic fibers, such as polyolefin fibers (e.g., polyethylene fibers, polyethylene copolymer fibers, polypropylene fibers, polypropylene copolymer fibers, etc.) have an intrinsically non-polar and high crystalline surface structure which can result in segregation of the synthetic fibers from the natural cellulose fibers. This segregation may result in a layer, and in turn a medium, with poor formation and mechanical strength. To overcome the intrinsic property of these synthetic fibers, the synthetic fibers may be i) pre-treated in a corona chamber at room temperature and atmosphere to graft the polar groups (e.g., hydroxyl, ketone and carboxyl groups), or ii) pre-washed with $H_2SO_4H$ solution of 30% to 50% concentration by weight to oxidize and etch the surface to improve its hydrophilicity.

It is to be understood that each of the two or more non-woven paper layers 104, 108 may further include from about 1 wt % to about 10 wt %, or from about 1 wt % to about 20 wt % of a filler, if desired. The filler may further increase the opacity of the substrate 102. The filler may be an inorganic particulate material chosen from any suitable inorganic filler material. Some examples of inorganic filler materials include calcium carbonates, alumina trihydrate, talc, barium sulfate, clays, silica, and titanium dioxide ($TiO_2$). In an example, the filler is chosen from calcium carbonates, clays, titanium dioxide, and combinations thereof.

In an example, each of the two or more non-woven paper layers 104, 108, exhibits a ratio of machine direction (MD) tensile stiffness to cross direction (CD) tensile stiffness of less than 2.5. In some examples, it may be desirable that the MD/CD tensile stiffness ratio be less than 2.0. In an example, one or both/all of the two or more non-woven paper layers 104, 108 are chosen to impart a desirable mechanical property (e.g. durability) to the substrate 102, For instance, the layers 104, 108 of substrate 102 may each have a machine direction (MD) tensile stiffness, measured using an Intron device available from Testing Machines, Inc. (Newcastle, Del.), that is greater than 25 lbs/inch. Further, the layers 104, 108 may each have a cross direction (CD) tensile stiffness, also measured using an Intron device, that is greater than 15 lbs/inch.

In an example, the non-woven paper layers 104, 108 also exhibit desirable tear strength and tensile strength. For instance, the layers 104, 108 of substrate 102 may each have a machine direction (MD) tear strength that is 8 kgf or higher and a cross direction (CD) tear strength that is 9 kgf or higher, and may have a machine direction (MD) tensile strength that is 30 kgf or higher and cross direction (CD) tensile strength that is 20 kgf or higher. These example tear and tensile strength ranges may vary depending upon the thickness of the non-woven paper layer 104, 108.

It is to be understood that the stiffness and strength of the non-woven paper layers 104, 108 contribute to the overall stiffness and strength of the substrate 102 and the printable medium 100.

In a further example, the stiffness of the printable medium 100 ranges from about 5 gf·cm to about 50 gf·cm measured by a Taber Stiffness Tester available from Taber Industries (North Tonawanda, N.Y.).

Each of the two or more non-woven paper layers 104, 108 exhibits a hygroexpansivity of less than 1.5% in both the machine direction (MD) and the cross direction (CD). It may be desirable that the layer(s) 104, 108 exhibit hygroexpansivity less than 1% in both MD and CD. Hygroexpansivity is a change in the dimension(s) of the paper layer(s) 104, 108 as a result of a change in moisture or humidity in the surrounding environment. Hygroexpansivity may be tested using ASTM F793 (e.g., version 2010). The smaller the hygroexpansivity (i.e., the closer to 0%), the less the shrinkage or expansion of the printed image on the medium 100.

It is to be understood that one or more additives may also be added to one or more of the paper layers 104, 108, examples of which include internal sizing agents, wet and dry strengthening agents, dyes, optical brightening agents, and/or the like.

As mentioned above, the substrate 102 may have an image receiving layer 106 coated thereon. In an example, the image receiving layer 106 includes a pigment chosen from aluminum silicate, kaolin clay, calcium carbonate, silica, alumina, boehmite, mica, talc, and combinations thereof. The example image receiving layer 106 further includes a polymeric binder and a latex ink film-forming agent.

It is to be understood that the pigment for the image receiving layer 106 may be selected from both inorganic and/or organic particulates, either in solid powder form or in dispersed slurry form. Some examples of inorganic particulates include aluminum silicate, kaolin clay, a calcium carbonate, silica gel, fumed silica, alumina, boehmite, mica, talc, and combinations thereof. In some examples, the inorganic pigment includes a clay or a clay mixture. In other examples, the inorganic pigment includes a calcium carbonate or a calcium carbonate mixture. The calcium carbonate may be one or more of ground calcium carbonate (GCC), precipitated calcium carbonate (PCC), modified GCC, and modified PCC. It is to be further understood that other combinations of any of the inorganic pigments described may be used. For example, the inorganic pigment may include a mixture of a calcium carbonate and clay. In another example, the inorganic pigment may include two different calcium carbonates (e.g., GCC and PCC). An example of suitable organic particulates is polystyrene.

In an example, the pigment for the image receiving layer 106 may be chosen from silica gel (e.g., SILOJET® 703C available from Grace Co., Japan), modified (e.g., surface modified, chemically modified, etc.) calcium carbonate (e.g., OMYAJET™ B6606, C3301, and 5010, all of which are available from Omya, Inc., Oftringen, Switzerland), precipitated calcium carbonate (e.g., JETCOAT® 30 available from Specialty Minerals, Inc.; Bethlehem, Pa.), and combinations thereof. The modified calcium carbonate is modified, e.g., to improve the performance of the ink (e.g., the dye-based ink) to be received on the image receiving layer 106. The pigment(s) is/are present in the image receiving layer 106 in an amount ranging, for example, from about 65 wt % to about 85 wt % of the total wt % of the image receiving layer 106.

Some examples of suitable polymeric binders for the image receiving layer 106 include aqueous based binders such as polyvinyl alcohol (examples of which include KURARAY POVAL® 235, MOWIOL® 40-88, and MOWIOL® 20-98 available from Kuraray America, Inc., Houston, Tex.), styrene-butadiene emulsions, acrylonitrile-butadiene latex, and combinations thereof. It is to be understood that any of the binders listed above for the adhesive layer 110 may be used in the image receiving layer 106.

It is to be understood that the amount of the binder in the image receiving layer 106 may be any suitable amount, however, in an example, the amount of the binder ranges from about 10 parts to about 40 parts per 100 parts of image receiving layer pigment by dry weight. In another example, the amount of the binder ranges from about 15 parts to about 25 parts per 100 parts of image receiving layer pigment by dry weight.

As mentioned above, the example image receiving layer 106 may include a latex ink film-forming agent. The latex ink film-forming agent may be desirable when the image receiving layer 106 is to have a latex ink printed thereon. It is to be understood that the film-forming agent that is used is capable of lowering the elastic modulus of polymer particulates (found in latex inks to be printed on the inkjet printable medium 100) and providing temporary plasticization, which promotes polymer chain motion of the polymer particulates during the film forming process. As such, the polymer particulates are more readily able to coalesce, and therefore the film-forming agent improves the film-forming properties of the polymer particulates. Suitable film-forming agents exhibit both compatibility with aqueous solvents (e.g., water) and temperature volatility. Film-forming agents that exhibit temperature volatility are able to remain in the liquid state and have less than 30% to 70% volatility under heated post-treatment processing. Examples of the film-forming agents include citrate compounds, sebacate compounds, ethoxy alcohols, glycol oligomers, glycol polymers, glycol ether, glycerol acetals, anionic, cationic or non-ionic surfactants having a more than 12 carbon backbone (e.g., propylene glycol monoester of C-18 fatty acids and propylene glycol mono oleate, each of which is commercially available under the trade name LOXANOL® by BASF Corp. Florham Park, N.J.), cyclic amides, and combinations thereof. The cyclic amides may be β-lactams (e.g., clavam, oxacephem, cephem, penam, carbapenam, and monobactam), γ-lactams (e.g., N-methyl-2-Pyrrolidone, 5-methyl-2-Pyrrolidone, and 2-Pyrrolidone), δ-lactams (e.g., caprolactam and glucarolactam), and combinations thereof.

In an example, the latex ink film-forming agent is a lactam such as β-lactam, γ-lactam, δ-lactam, and combinations thereof. In another example, the latex ink film-forming agent is a γ-lactam.

The polymer particulates (found in latex inks to be printed) may be latex particles made up of monomer(s) that are polymerized in a random, block, and/or grafting manner, and in some instances are cross-linked. One or more types of monomers may be polymerized to form the polymer particulates. In an example, the polymer particulates are homopolymers of methacrylic acid esters. In another example, the polymer particulates are copolymers of a methacrylic acid ester and any of an acrylic acid ester, styrene, or divinyl benzene. Some examples of the monomers that may be used to form the polymer particulates include methyl methacrylate, t-butyl-methacrylate, methyl acrylate, ethyl (meth)acrylate, butyl (meth)acrylate, 2-ethylhexyl (meth)acrylate, benzyl (meth) acrylate, lauryl (meth)acrylate, oleyl (meth)acrylate, palmityl (meth)acrylate, stearyl (meth)acrylate, hydroxyethylacrylate, hydroxyethylmethacrylate, hydroxypropylacrylate, hydroxypropylmethacrylate, ethylene glycol di(meth)acrylate, allyl (meth)acrylate, 1,3-butane-diol di(meth)acrylate, diethylene glycol di(meth)acrylate, and trimethylol propane trimethacrylate.

In some examples, the polymeric particulate (found in latex inks to be printed) are prepared using an emulsion polymerization process. For example, various weight ratios of styrene, hexyl methacrylate, ethylene glycol di(meth)acrylate, and methacrylic acid may be mixed together to emulsify monomer droplets. These droplets may be dispersed under mechanical shear force surrounded by emulsifiers to form micelles. Polymerization takes place after initiator molecules diffuse into the micelles, which forms the polymer particulates. In an example, the styrene and hexyl methacrylate monomers may be used in amounts so that they will provide the bulk of the polymeric particulates (e.g., from about 75 wt % to about 85 wt %), and the ethylene glycol di(meth)acrylate and methacrylic acid monomers may be used in smaller amounts (e.g., equal to or less than 25 wt %).

The polymer particulates (found in latex inks to be printed) may have a weight average molecular weight ranging from about 10,000 to about 2,000,000 or as one example, from about 40,000 to about 100,000. When the polymer particulates are cross-linked, the combined molecular weight of the cross-linked particulates may exceed 2,000,000. In addition, the average particle diameter of the polymer particulates ranges from about 20 nm to about 500 nm. In an example, the average particle diameter ranges from about 100 nm to about 300 nm.

The image receiving layer 106 may further include other additives, e.g., processing aids and property modifiers, in some examples of the present disclosure. Examples of additives that may be incorporated into examples of the image receiving layer 106 include a crosslinking agent, a surfactant, a defoamer, a fixing agent, and/or a pH adjuster. In an example, the image receiving layer 106 includes from about 1 wt % to about 3 wt % of boric acid as a crosslinking agent, from about 0.5 wt % to about 2 wt % of glycerol, and about 1 wt % to about 5 wt % of a dye fixing agent such as e.g., LOCRON® P available from Clariant International Ltd., Switzerland). The image receiving layer 106 may also include a defoamer in an amount ranging from about 0.05 wt % to about 0.2 wt % of the total wt % of the image receiving layer 106. Examples of the defoamer include FOA-MASTER® 1410, 1420, 1430, all of which are available from BASF Corp., Florham Park, N.J.

In another example, additional cationic additives may be added to the image receiving layer 106 based on the waterfastness required by the ink to be printed on the medium 100. Some examples of additional cationic additives that may be incorporated into the image receiving layer 106 include poly-diallyldimethylammonium chloride (i.e., poly-DADMAC) and polyhexamethylene biguanide (PHMB). In an example, the amount of the cationic additives that may be incorporated into the image receiving layer 106 ranges from about 5 wt % to about 20 wt % of the total wt % of the image receiving layer 106.

To achieve suitable image quality, the surface pH of the printable medium 100 should range, for example, from about 4 to about 6.8. In another example, the surface pH ranges from about 4.5 to about 5.5. The desirable pH level of the printable medium 100 may be achieved by incorporating a pH adjuster into the image receiving layer 106 in an amount necessary to adjust the pH to fall within the desirable pH ranges mentioned above. Examples of the pH adjuster include diluted HCl which may be added to decrease the pH, and NaOH which may be added to increase the pH.

Further, the coat weight of the image receiving layer 106 ranges, for example, from about 10 gsm to about 40 gsm. In another example, the coat weight of the image receiving layer 106 ranges from about 20 gsm to about 30 gsm. Once coated, the image receiving composition dries to form a layer (i.e., the image receiving layer 106). In an example, the thickness of the image receiving layer 106 ranges from about 10 microns to about 40 microns. In another example, the thickness of the image receiving layer 106 ranges from about 20 microns to about 30 microns.

Figure 2:
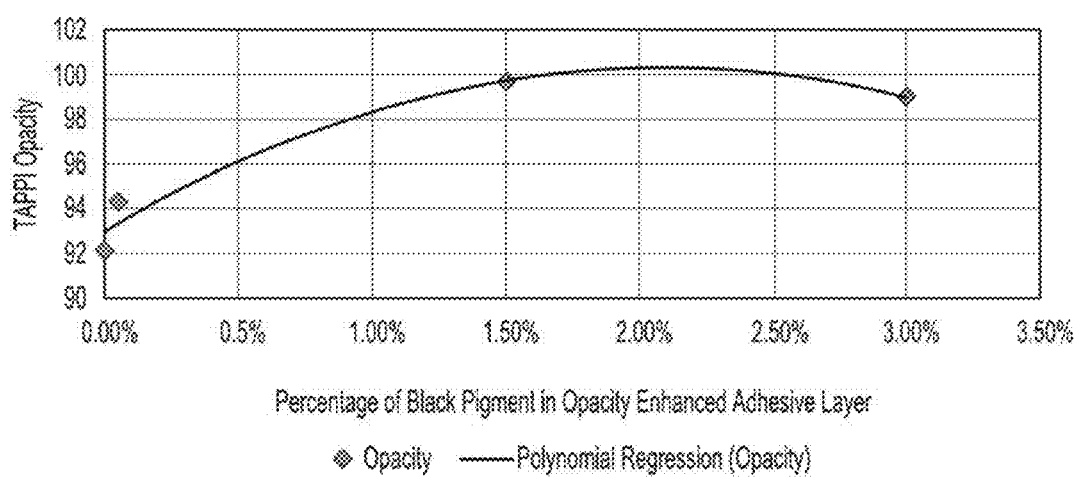
FIG. 2 is a graph illustrating TAPPI Opacity versus percentage of black dye in the opacity enhanced adhesive layer for examples of the print medium of the present disclosure.

FIG. 2 is a graph illustrating TAPPI Opacity versus percentage of black pigment in the opacity enhanced adhesive layer 110 for examples of the print medium 100 of the present disclosure. The opacity enhanced adhesive layers 110 tested included a polyacrylic copolymer emulsion namely ACRONAL® S866 from BASF Corp., and Pigment Black 7 in varying amounts. The coat weight (ranging from about 5 gsm to about 10 gsm) of the layers was controlled using #15 Mayer Rod. Opacity was tested using TAPPI test method T425. In accordance with this test method, a reflectance measurement was made on a sheet of paper backed by a black backing, $R_0$. Another reflectance measurement was made on the sheet backed by an 89% reflective tile, $R_{0.89}$. Opacity=$100 \times R_0/R_{0.89}$. Higher opacity values indicate that it is more difficult to see through the sheet of paper.

As can be seen from the results in the graph, when the amount of black pigment (relative to the total weight of the opacity enhancing adhesive layer 110) ranges from about 0.05 wt % to about 3 wt %, the opacity ranges from about 94 to close to 100. As examples, when the black pigment is at 0% and the polyacrylic copolymer emulsion is at 100%, the opacity is 92.1; when the black pigment is at 0.05% and the polyacrylic copolymer emulsion is at 99.05%, the opacity is 94.3; when the black pigment is at 1.5% and the polyacrylic copolymer emulsion is at 98.5%, the opacity is 100; and when the black pigment is at 3% and the polyacrylic copolymer emulsion is at 97%, the opacity is 99. In addition to examples of printable medium 100 meeting strength requirements (e.g., tear strength, tensile strength, tensile stiffness and stiffness provided herein) for wallpaper, the results shown in FIG. 2 demonstrate that examples of the printable medium 100 also have high light blockout capability (e.g., to hide imperfection(s) and/or prior paints, coverings, and/or decorations on the wall). As such, it can be seen that the example printable medium 100 formed from a composite structure, in which two (or more) non-woven paper faces 104, 108 are laminated with examples of the opacity enhancing adhesive layer 110 provides desirable properties and advantages for use as wallpaper covering. The example medium 100 may be fed into a suitable inkjet printer (not shown) in order to print any desirable images thereon.

Figure 3A:
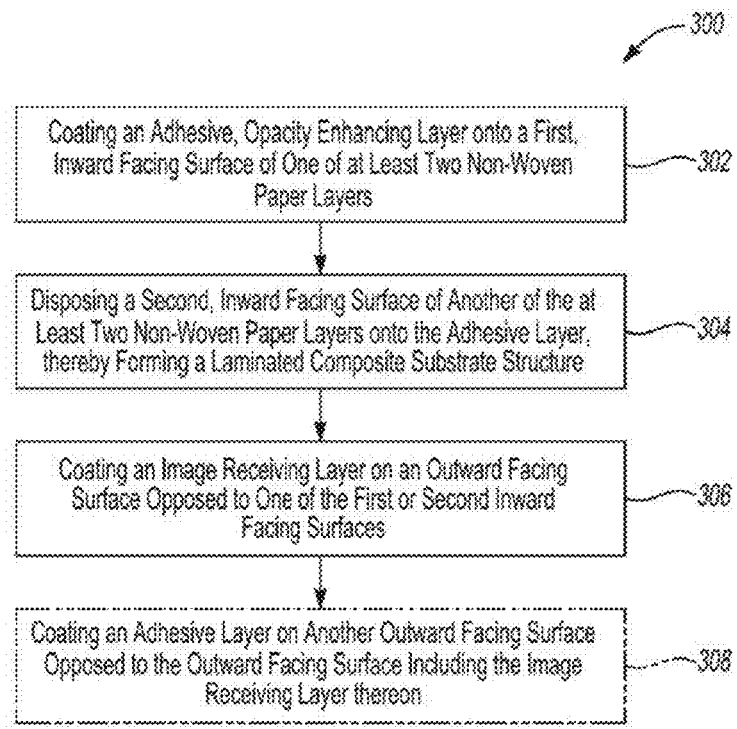
FIG. 3A is a flow diagram depicting an example of a method for making an example of the printable medium.

Referring now to FIGS. 1 and 3A together, an example of a method 380 of making an example of the inkjet printable medium 100 includes coating an adhesive, opacity enhancing layer 110 onto a first, inward facing surface 112 of one 108 of at least two non-woven paper layers 104, 108, as shown at step 302. The example method 300 further includes disposing a second, inward facing surface 112' of another 104 of the at least two non-woven paper layers 104, 108 onto the adhesive layer 110, thereby forming a laminated composite substrate structure 102, as shown at step 304.

The example method 300 further includes coating image receiving layer 106 on an outward facing surface 114 or 114' opposed to one of the first or second inward facing surfaces 112 or 112', as shown at step 306. In FIG. 1, image receiving layer 106 is shown on surface 114' of paper layer 104, though in another example, it could be disposed on surface 114 of paper layer 108.

Another example of method 300 includes coating glue layer 118 on another outward facing surface 114' or 114 opposed to the outward facing surface 114 or 114' including the image receiving layer thereon 106, as shown in phantom at step 308. In FIG. 1, glue layer 118 is shown in phantom on surface 114 of paper layer 108. In the other example (with layer 106 disposed on surface 114), glue layer 118 (if present) would not be disposed on surface 114, but rather would be on surface 114'.

It is to be understood that any suitable method may be used to deposit, establish or otherwise dispose any of the adhesive layer 110, image receiving layer 106 and glue layer 118 (if present) onto the respective surface of printed medium 100. However, in an example, in an example, any of layers 110, 106 and 118 may be coated on the respective surface of medium 100 using a wet coating method. Examples of wet coating methods include those that use a rod coater, roll coater, slot die coater, and/or blade coater.

Figure 3B:
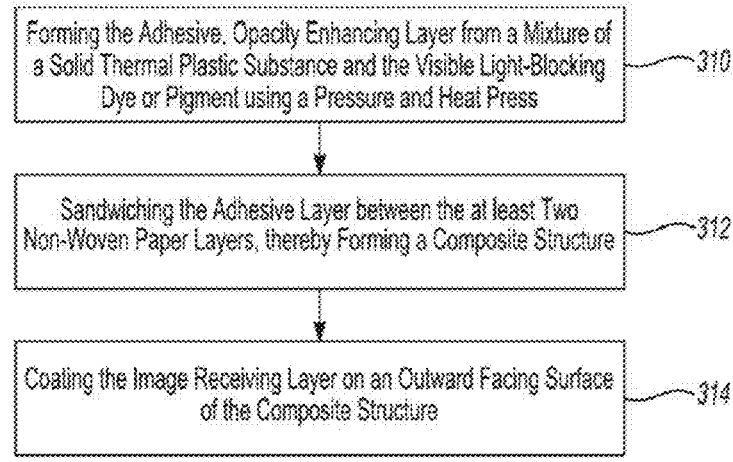
FIG. 3B is a flow diagram depicting another example of a method for making an example of the printable medium.

Referring now to FIGS. 1 and 3B together, another example of a method 300' of making an example of the inkjet printable medium 100 includes forming the adhesive, opacity enhancing layer 110 from a mixture of a solid thermal plastic substance and the visible light-blocking dye or pigment using a pressure and heat press, as shown at step 310. The example method 300' also includes sandwiching the adhesive layer 110 between the at least two nonwoven paper layers 104, 108, thereby forming a composite structure 102. The pressure and heat press may include a blending machine for forming the mixture of the solid thermal plastic substance and the visible light-blocking dye and/or pigment, or for blending the pre-mixed components. The pressure and heat press may also include an extruder for converting the blended mixture into the thin layer/film 110. In an example, the pressure conditions utilized range from about 100 PSI to about 1000 PSI and the temperature conditions utilized range from about 80° C. to about 250° C. It is to be understood however, that pressure and/or temperature may vary depending upon the plastic substance that is selected. For example, a plastic substance with a higher glass transition temperature may require a higher pressure and temperature to form the adhesive, opacity enhancing layer 110. A sheeter may then be used for sandwiching the layers 104, 110, 108 together (i.e., to introduce the thin layer/film 110 between the non-oven paper layers 104, 108). This process is similar to an extrusion lamination process which presses two surfaces together with a film therebetween while the film is still soft.

The example method 300' further includes coating image receiving layer 106 on an outward facing surface 114 or 114' of the composite structure 102, as shown at step 312. In FIG. 1, image receiving layer 106 is shown on surface 114' of paper layer 104, though in another example, it could be disposed on surface 114 of paper layer 108. It is to be understood that the glue layer 118 may also be used in this example method 300' in the same manner as described herein.

Figure 4:
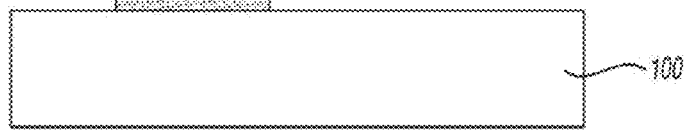
FIG. 4 schematically depicts an example of a printed article including an example of the printable medium and an ink deposited on a surface of the printable medium.

Also disclosed herein is a printed article 400 as shown in FIG. 4. The printed article 400 (an example of which is wallpaper) includes the printable medium 100 upon which an ink 402 is deposited. As previously mentioned, for some examples of the printable medium 100, the ink may be chosen from a pigment-based inkjet ink, a pigmented latex-based ink, a UV curable inkjet ink, and a dye-based inkjet ink. For other examples of the printable medium 100, the ink may be chosen from a pigment-based inkjet ink or a pigmented latex-based ink.

Figure 5:
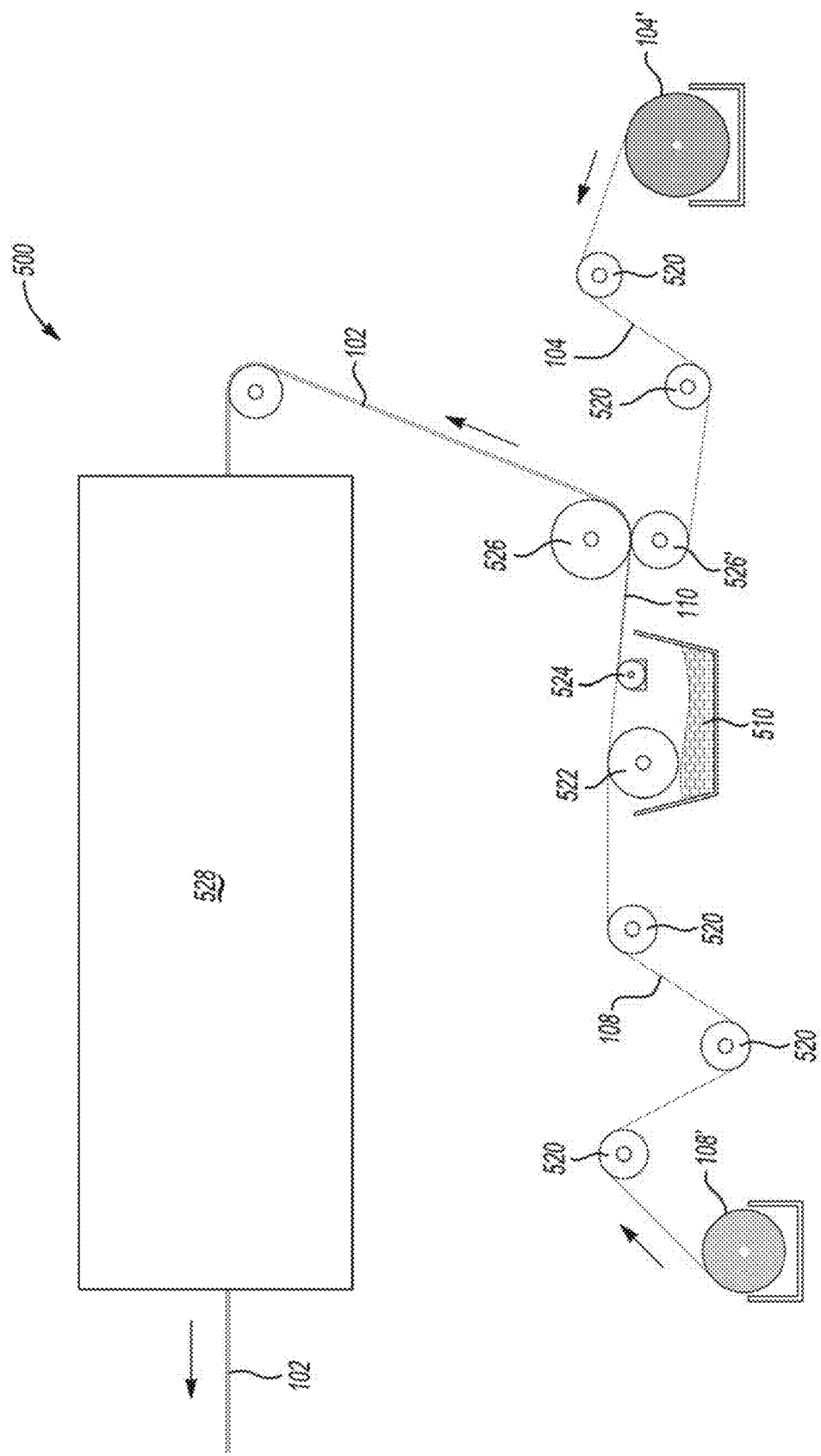
FIG. 5 is a schematic process flow diagram illustrating an example of a method for making an example of a substrate for the printable medium.

FIG. 5 is a schematic process flow diagram illustrating an example of a method 500 for making an example of a substrate 102 for the printable medium 100. A roll 108' of paper layer 108 is provided, as is a roll 104' of paper layer 104. Paper layer 108 is fed, via various tension rollers 520 and pick-up roller 522, to a bath of opacity enhancing adhesive 510. Adhesive layer 110 is applied to paper layer 108 via a metering rod 524. Paper layer 104 is fed, via various tension rollers 520 to lamination rollers 526, 526'. Paper layer 108 with adhesive layer 110 is then laminated to paper layer 104 at the lamination rollers 526, thereby forming the laminated composite substrate 102. Substrate 102 is then fed via tension roller(s) 520 to a dryer 528. Drying may be accomplished, for example, using a hot air dryer (e.g., 50° C. to 188° C.)

As mentioned above, the adhesive layer 110 may be applied before combining the layers 104, 110, 108 at a lamination nip. For example, a paper layer 104 web and a paper layer 108 web (with a surface of at least one of the webs including the wet adhesive) may be combined at the lamination nip and pressed together using a driven, chrome-plated steel roll 526 and rubber coated pressure roll 526'. Examples of wet lamination equipment that may be used include Talon 64 (152.4 cm wide web) from GBC, Lincolnshire, Ill.; 62 Pro laminating machine (152.4 cm wide web) from Seal, Elkridge, Md.; a lab unit lamination machine (60.96 cm wide web) for example, MATRIX DUD™; and those lamination machines from Polytype Converting Ltd., Freiburg, Switzerland. Other coating and laminating machines may be obtained from Faustel, Germantown, Wis. and Black Clawson Ltd, Newport, South Wales, UK, for example. Some laminating machines enable a paper layer 104, 108 to be coated on each side with the adhesive and then to be wet laminated with respective adhesive layers 110 on each side (e.g., if the substrate 102 included three or more paper layers 104, 108).

To further illustrate the present disclosure, an example is given herein. It is to be understood that this example is provided for illustrative purposes and is not to be construed as limiting the scope of the present disclosure.

EXAMPLE

A non-woven paper layer according to example disclosed herein was used in this example. The non-woven paper layer was 150 gsm and included about 15 wt % polyethylene terephthalate (PET) fibers, about 5 wt % calcium carbonate, binder present in a ratio of 10:100 binder:PET fibers, and about 80 wt % mixture of hard and soft wood fibers. The binder in the non-woven paper layer was a mixture of acrylic latex and styrene-acrylic latex in a ratio of 70:30. HP PVC free wallpaper was used as a comparative example. The non-woven paper layer and the HP PVC free wallpaper were tested for strength, hydroexpansivity, and Taber stiffness. The non-woven paper layer is referred to as the Sample and the HP PVC free wallpaper is referred to as the Comparative Sample.

Tear strength and tensile strength were measured in accordance with ASTM (formerly known as the American Society for Testing and Materials) D751. This test method measures the maximum force required to break a sample when the sample is pulled in opposite directions. In accordance with this test method, the Sample of the non-woven paper layer and the Comparative Sample of the typical wall covering were cut into pieces. The respective Sample and Comparative Sample were clamped into jaws and were pulled until they broke. The results are reported in kg-force. Table 1 illustrates the results in the machine direction (MD) and the cross direction (CD) of the Sample and the Comparative Sample.

TABLE 1

|  | Tear Strength (kgf) | | Tensile Strength (kgf) | |
| --- | --- | --- | --- | --- |
|  | MD | CD | MD | CD |
| Sample | 14.46 | 9.04 | 52.1 | 32 |
| Comparative Sample | 3.3 | 3.5 | 28.7 | 16.9 |

As illustrated in Table 1, the Sample of the non-woven paper layer was much stronger, both in tear strength and tensile strength, than the Comparative Sample.

Hygroexpansivity of the Sample and the Comparative Sample was also tested. Hygroexpansivity in the machine and cross directions was measured using ASTM F793 (entitled "Standard Classification of Wall Covering by Use Characteristics"), section 7.19 "Shrinkage". This procedure involved soaking specimens of the Sample and the Comparative Sample in distilled water for 30 minutes at standard conditions in accordance with ASTM D685. The Sample and Comparative Sample specimens were then withdrawn from the water and dried in a circulating air oven at 200° F. for 30 minutes. The Sample and Comparative Sample specimens were then conditioned at standard conditions for a period of 8 hours and shrinkage measurements were taken. The % shrinkage was determined by: $(A-B)/A \times 100$, where A=measurement before test and B=measurement after test. The % shrinkage results are shown in Table 2.

TABLE 2

|  | Hygroexpansion (% Shrinkage) | |
| --- | --- | --- |
|  | MD | CD |
| Sample | 0.50% | 0.80% |
| Comparative Sample | 0.50% | 2.20% |

As illustrated in Table 2, the Sample exhibited the same acceptable hygroexpansivity as the Comparative Sample in the machine direction (MD), but exhibited much less hygroexpansivity than the Comparative Sample in the cross direction (CD). Less hygroexpansivity is more desirable because this indicates less of a change in dimension of the material due to moisture and/or humidity uptake.

Taber stiffness of the Sample and the Comparative Sample were also tested using a Taber Stiffness Tester available from Taber Industries (North Tonawanda, N.Y.). These results are shown in Table 3. Both machine direction and cross direction Taber stiffness are reported in Taber units (gf·cm).

TABLE 3

|  | Taber Stiffness | | |
| --- | --- | --- | --- |
|  | MD | CD | MD/CD Ratio |
| Sample | 31.10 | 16.40 | 1.9 |
| Comparative Sample | 28.50 | 12.90 | 2.2 |

As illustrated, the Sample exhibited greater stiffness in both the machine direction and the cross direction, and a lower MD/CD ratio. Greater stiffness and a lower MD/CD ratio are desirable because these materials exhibit increased durability, wear, etc.

In describing and claiming the examples disclosed herein, the singular forms "a" "an", and "the" include plural referents unless the context clearly dictates otherwise.

It is to be understood that the ranges provided herein include the stated range and any value or sub-range within the stated range. For example, a range from zero to 0.05 should be interpreted to include not only the explicitly recited limits of about 0 to 0.05, but also to include individual values, such as 0.01, 0.02, 0.03, etc., and sub-ranges, such as from about 0.01 to about 0.04, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:
1. An inkjet printable medium, comprising:
an opaque substrate having $I(x)/I_0$ equal to or less than 0.05, wherein $I(x)$ is an intensity of light remaining at a distance x, where x is the distance that light travels through the substrate, and wherein $I_0$ is an initial intensity of light at x=0, the substrate including:

at least two non-woven paper layers; and
an adhesive, opacity enhancing layer disposed between the at least two non-woven paper layers, the adhesive layer including a visible light-blocking dye or pigment; and
an image receiving layer coated on the substrate;
wherein the substrate has a basis weight ranging from about 100 gsm to about 500 gsm.

2. The inkjet printable medium as defined in claim 1 wherein each of the at least two non-woven paper layers:
is formed from polymeric fibers, a binder, and a blend of hardwood fibers and softwood fibers;
exhibits a ratio of machine direction (MD) tensile stiffness to cross direction (CD) tensile stiffness of less than 2.5; and
exhibits a hygroexpansivity of less than 1%.

3. The inkjet printable medium as defined in claim 2 wherein the polymeric fibers are chosen from polyesters, polyamides, and polyolefins, and wherein a ratio of binder to polymeric fibers ranges from about 0.05:1 to about 0.3:1.

4. The inkjet printable medium as defined in claim 2 wherein each of the at least two non-woven paper layers further includes from about 1 wt % to about 20 wt % of a filler, the filler being chosen from calcium carbonates, clays, titanium dioxide, and combinations thereof.

5. The inkjet printable medium as defined in claim 1 wherein the visible light-blocking dye or pigment has an L* ranging from about 0 to about 50, the adhesive layer has a thickness ranging from about 5 microns to about 50 microns, and the adhesive layer includes a polymeric carrier having a glass transition temperature ($T_g$) ranging from about −40° C. to about 80° C.

6. The inkjet printable medium as defined in claim 1 wherein the adhesive layer includes an amount of the visible light-blocking dye or pigment, relative to a total weight of the adhesive layer, ranging from about 0.05 wt % to about 3 wt %.

7. The inkjet printable medium as defined in claim 5 wherein the polymeric adhesive carrier is a macromolecular aqueous emulsion chosen from polybutadiene latex, styrene-butadiene copolymer latex, acrylonitrile-butadiene-styrene terpolymer latex, polychloroprene latex, acrylic latex, polyester emulsions, acrylonitrile-butadiene latex, polyvinyl acetate, polyvinyl acetate copolymers, and combinations thereof, and wherein the adhesive layer further includes a crosslinking agent and a solvent.

8. The inkjet printable medium as defined in claim 5 wherein the polymeric adhesive carrier is an aqueous solution containing water soluble synthetic macromolecules or an aqueous solution containing water soluble natural macromolecules.

9. The inkjet printable medium as defined in claim 1 wherein the printable medium is to have received thereon any of a pigment-based inkjet ink, a pigmented latex-based inkjet ink, a UV curable inkjet ink, or a dye-based inkjet ink, and wherein the image receiving layer includes:
a pigment chosen from aluminum silicate, kaolin clay, calcium carbonate, silica, alumina, boehmite, mica, talc, and combinations thereof; and
a polymeric binder.

10. The inkjet printable medium as defined in claim 9 wherein the image receiving layer further includes a latex ink film-forming agent chosen from citrates, sebacates, ethyoxy alcohols, glycol oligomers, glycol polymers, glycol ethers, glycerol acetyls, anionic, cationic or non-ionic surfactants having a more than 12 carbon backbone, cyclic amides, and combinations thereof.

11. The inkjet printable medium as defined in claim 10 wherein the latex ink film-forming agent is a cyclic amide chosen from β-lactam, γ-lactam, and δ-lactam, and combinations thereof.

12. A method of making inkjet printable medium of claim 1, the method comprising:
forming the adhesive, opacity enhancing layer from a mixture of a solid thermal plastic substance and the visible light-blocking dye or pigment using a pressure and heat press;
sandwiching the adhesive layer between the at least two non-woven paper layers, thereby forming a composite structure; and
coating the image receiving layer on an outward facing surface of the composite structure.

13. A method of the inkjet printable medium of claim 1, the method comprising:
forming the substrate by coating the adhesive, opacity enhancing layer onto a first, inward facing surface of one of the at least two non-woven paper layers, and then disposing a second, inward facing surface of an other of the at least two non-woven paper layers onto the adhesive layer, thereby forming a laminated composite structure; and
coating the image receiving layer on an outward facing surface opposed to one of the first or second inward facing surfaces.

14. The method as defined in claim 13 wherein the coating of the adhesive layer and the coating of the image receiving layer are each accomplished using a wet coating process.

15. A printed article, comprising:
the inkjet printable medium of claim 1; and
any of a pigment-based inkjet ink, a pigmented latex-based inkjet ink, a UV curable inkjet ink, or a dye-based inkjet ink deposited on the printable medium.

* * * * *